(12) United States Patent
Wade (10) Patent No.: US 9,578,763 B1
(45) Date of Patent: Feb. 21, 2017

(54) TAMPER DETECTION USING INTERNAL POWER SIGNAL

(71) Applicant: Square, Inc., San Francisco, CA (US)

(72) Inventor: Jeremy Wade, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 57 days.

(21) Appl. No.: 14/285,438

(22) Filed: May 22, 2014

(51) Int. Cl.
  *H05K 7/20* (2006.01)
  *H05K 5/02* (2006.01)
  *H05K 5/00* (2006.01)

(52) U.S. Cl.
  CPC .......... *H05K 5/0208* (2013.01); *H05K 5/0086* (2013.01)

(58) Field of Classification Search
  CPC ............................ H05K 5/0208; H05K 5/0086
  USPC ...................................... 361/679.32; 257/678
  See application file for complete search history.

(56) References Cited

U.S. PATENT DOCUMENTS

| | | | | |
|---|---|---|---|---|
| 5,880,523 A * | 3/1999 | Candelore | ............... | G06F 21/86 257/679 |
| 6,234,389 B1 * | 5/2001 | Valliani | .................. | G06Q 20/20 235/379 |
| 7,343,496 B1 * | 3/2008 | Hsiang | .................. | G06F 21/572 257/922 |
| 7,373,667 B1 * | 5/2008 | Millard | ................. | G06F 21/445 707/999.001 |
| 2008/0164320 A1 * | 7/2008 | Garrido-Gadea | .... | G06K 7/0013 235/486 |
| 2011/0253788 A1 * | 10/2011 | Campbell | ............ | G06K 7/0008 235/441 |
| 2012/0091201 A1 * | 4/2012 | Babu | .................... | G06Q 20/322 235/380 |
| 2014/0204529 A1 * | 7/2014 | White | ................... | G06F 1/1675 361/679.55 |

\* cited by examiner

*Primary Examiner* — Dion R Ferguson
*Assistant Examiner* — Mandeep S Buttar
(74) *Attorney, Agent, or Firm* — Perkins Coie LLP (57) ABSTRACT

Disclosed is a technique for tamper detection in an electronic device by use of an internal power supply signal. The technique includes electrically coupling a conductive trace, in series via a resistor, to an internal power supply that supplies power to a security module within a processor of the device. The technique further includes electrically coupling the power supply to a detector for use in tamper detection on the trace. Upon occurrence of a short-circuit condition on the conductive trace, substantially all voltage of the local power supply is dropped across the resistor. As a result, the detector detects a drop in voltage below a predetermined threshold, and perceives such drop as a "collapse" of the internal power supply. The collapse of the power supply is indicative of a tampering event to the detector, which in response, outputs a signal to disable an operation of the security module.

24 Claims, 6 Drawing Sheets

TAMPER DETECTION USING INTERNAL POWER SIGNAL

BACKGROUND

For certain electronic devices, it is particularly important to protect against physical tampering after the device has been sold or distributed to an end-user. For example, tampering is of particular concern for devices that store or process sensitive data and for devices having functions or capabilities that incentivize unwanted, unauthorized intrusions into the devices.

A traditional tamper detection technique in an electronic device is to enshroud the sensitive components (e.g., circuit board) within the device with a wire mesh. The wire mesh is connected to an electrical power source and to a detector within the device. Any attempt to physically access the components will likely damage the mesh to the extent of causing an open circuit condition in the mesh. The detector detects this open circuit condition as tampering, and can trigger an appropriate countermeasure in response.

While such a mesh provides some degree of tampering protection, it is possible for a determined attacker to circumvent it. For example, given the time for careful inspection, an attacker could succeed in isolating a portion of the components from the mesh or opening the electronic device without necessarily damaging the mesh.

BRIEF DESCRIPTION OF THE DRAWINGS

One or more embodiments of the introduced technique are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Introduced here is a technique for providing tamper detection in an electronic device by use of an existing internal power supply signal. In at least some embodiments, the introduced technique includes electrically coupling a conductive (e.g., metal) trace, in series via a resistor, to an internal power supply (e.g., battery) that supplies power to a security module within a processor of the electronic device. The security module performs various security operations involving sensitive data received by the electronic device. The introduced technique further includes electrically coupling the internal power supply to a power detector for use in tamper detection on the conductive trace, such that a physical tampering-induced short-circuit condition on the conductive trace would result in a (significant) drop in voltage below a predetermined threshold (e.g., 0.01 V) at a node measured by the power detector, where substantially all voltage of the battery is dropped (e.g., 99.9%). The power detector detects and perceives the drop in voltage as a "collapse" of the power supply. As used here, the term "collapse" refers to an operation failure of an electronic component (e.g., a battery fail). Such collapse of the power supply is indicative of a tampering event to the detector, which in response, can output a signal to cause one or more operations of the security module to be disabled.

The introduced technique is advantageous in that it utilizes the availability (or lack thereof) of an existing signal (i.e., internal power supply signal) of the security module to detect physical tampering with the electronic device. Hence, any operation being performed by the security module can be disabled substantially immediately upon detecting tampering with the technique introduced here. Furthermore, the introduced technique can be combined with other traditional tamper detection techniques to increase the complexity and robustness of the detection mechanism, thereby enhancing the overall security of the electronic device.

In some embodiments, the conductive trace can include a wire mesh, which can be disposed along a circuit board layer within the electronic device. The term "mesh" as used here refers to one or more conductive traces that may be, but are not necessarily, electrically coupled to each other. In some embodiments, the conductive trace can be interwoven with one or more other conductive traces that are connected to another detector (different from the power detector) using a traditional tamper detection technique (i.e., "traditional conductive traces" or "traditional mesh"). In particular, the different interwoven conductive traces can run very closely together, along spatially parallel paths, across one or more circuit board layers, to render it more difficult for an attacker to circumvent the traces of the electronic device. In such "dual-trace" embodiments, the traditional trace(s) can be used to detect an open-circuit condition while the other trace (connected to the internal power supply) is used to detect a short-circuit condition, for example.

In some embodiments, the conductive trace can include a metal dome switch, which can be affixed to an electronic surface of a component of the electronic device (e.g., circuit board) during the manufacturing process. In such embodiments, the conductive trace (connected to the internal power supply) can be used to detect a short-circuit condition on the metal dome switch, such as may result from physical tampering. In some embodiments, the conductive trace can be combined with another conductive trace to facilitate detection of physical tampering with an input interface of the electronic device. In such embodiments, one trace can be disposed within a flexible circuit region of the input interface while the other trace is disposed spatially in parallel with the electrical connector between the input interface and the electronic device. Tampering is determined to be detected upon detection of a short-circuit condition on either trace.

In certain embodiments, the electronic device in which the introduced technique is implemented is a card reader designed to be coupled to a handheld mobile device (e.g., a smartphone or tablet computer) and configured to read data from a wallet-size card (e.g., a credit card, debit card, driver's license or identification card) based on a card swipe. The term "swipe" as used here refers to an action of reading data from a card, including reading a magnetic stripe, reading a smartcard integrated circuit (IC) chip, reading an optical pattern, etc. These features and aspects are discussed further below in connection with the accompanying figures.

Figure 1:
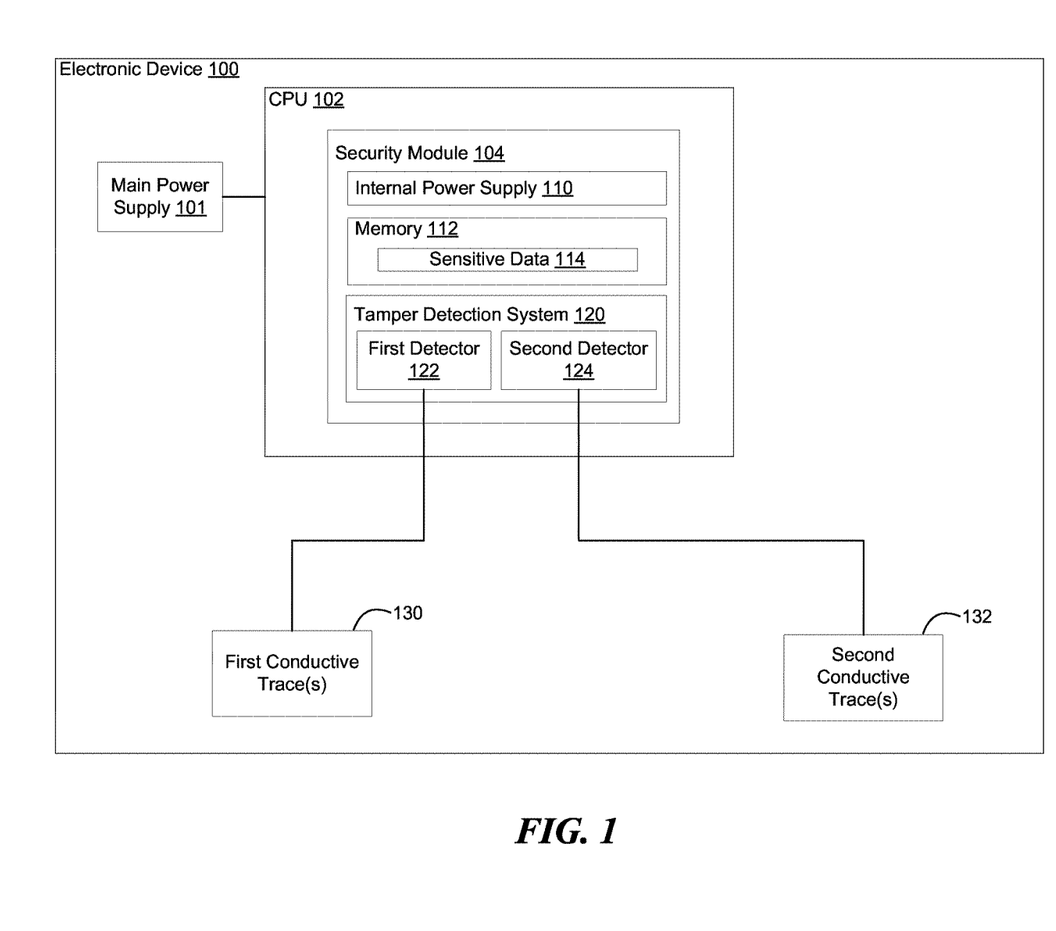
FIG. 1 conceptually illustrates an electronic device in which the tamper detection technique can be implemented.

FIG. 1 conceptually illustrates an electronic device 100 in which the tamper detection technique can be implemented. Note that FIG. 1 omits certain components of the electronic device 100 that are not germane to the present discussion. As such, the electronic device 100 may have additional components, such as one or more external connectors and/or input/output (I/O) devices (not shown), to enable the electronic device 100 to connect to an external device and/or to a user, or other components that enable the device 100 to perform various functionalities. As noted above and further described below, the electronic device 100 can be a card reader.

The electronic device 100 includes a main power supply 101 and a central processing unit (CPU) 102. The CPU 102 includes a security module 104, which includes an internal power supply 110, a memory 112 for storing sensitive data 114, and a tamper detection system 120 for detecting one or more tampering events within the device 100. The security module 104 can perform one or more security operations instructed by the CPU 102 (e.g., operations involving sensitive information or data). The one or more security operations can include, for example, storing an encryption key in the memory 112 and/or using the encryption key to encrypt sensitive information received by the device 100. In some embodiments, the security module 104 can perform a security operation on its own initiative, without instruction from the CPU 102, for example, performing an erase of the memory 112 (e.g., in response to tampering detected by the tamper detection system 120). The internal power supply 110 is dedicated to provide voltage to the security module 104 for carrying out the various operations involving the sensitive data 114. The internal power supply 110 has a smaller capacity of power than the main power supply 101, which is responsible for supplying voltage to the CPU 102 (in addition to other components of the electronic device 100). The internal power supply 110 can be, for example, a "coin cell" type battery.

The tamper detection system 120 includes a first detector 122 and a second detector 124. The first detector 122 is connected to one or more first conductive traces 130, where the first conductive traces 130 are coupled to the internal power supply 110 of the security module 104 to facilitate tamper detection, the nature of which will be discussed in further detail below. The second detector 124 is connected to one or more second conductive traces 132 to further facilitate the tamper detection, by use of one or more traditional tamper detection techniques.

According to the embodiment, the electronic device 100 includes a housing (not shown) to protect one or more circuit boards (not shown) within the device 100, where the circuit boards contain various electrical components that carry out the functions of the device 100, such as the CPU 102, the security module 104, etc. In this regard, disposed within the electronic device 100 at various locations are one or more of the first and second conductive traces 130, 132 to facilitate the tamper detection. In some embodiments, a particular conductive trace (e.g., 130 or 132) is disposed at least partially along one or more interior surfaces of the housing. In some embodiments, the particular conductive trace (e.g., 130 or 132) is disposed at least partially along one or more circuit board layers within the electronic device 100. In some embodiments, the particular conductive trace (e.g., 130 or 132) is disposed within a particular electrical component of the electronic device 100.

A conductive trace, or a conductor, (e.g., trace 130 or trace 132) can include, for example, one or more metal wires or metal traces (e.g., of the type formed through a deposition-and-etch process). As used here, the term "trace" refers to any form of conductive path. In some embodiments, a conductive trace can include a metal dome switch that is affixed to an interior surface of the housing. The metal dome switch, which can be any conventional switch contact used to produce a positive tactile feedback, may be used to detect tampering through detection of an "undepressed" physical state of the switch caused by an opening of the housing. In some embodiments, the conductive traces 130 can form one or more conductive loops, collectively referred to as a conductive "mesh."

As briefly discussed above, the conductive trace(s) 130 and 132 are different in how each is utilized to detect tamper detection (i.e., the introduced technique versus traditional technique(s)). In some embodiments, the two different conductive traces 130 and 132 are both disposed within the electronic device 100, where they may be physically connected or physically separate from each other. In some embodiments, the two different conductive traces 130, 132 are interwoven and disposed in close proximity and spatially parallel to each other. Detail of various configurations utilizing the first and second conductive traces 130, 132 to detect tampering will be discussed, at least, in FIG. 2, FIG. 3, and FIG. 4, in accordance with various embodiments of the introduced technique.

Each of the conductive traces 130, 132 is coupled to a detector (i.e., first detector 122 and second detector 124 respectively), which can detect an open-circuit condition, a short-circuit condition, or both, on each respective trace. For example, if an attempt to drill into or open the electronic device 100 breaks any one of the conductive traces 130, 132, or connects several of the conductive traces 130, 132, an open-circuit or short-circuit condition will result and will be detected by the detector (e.g., first detector 122 or second detector 124).

According to the disclosed technique, the first detector 122 can detect a short-circuit condition on the first conductive trace 130 by virtue of an electrical connection between the first detector 122 and the trace 130 at a node (not shown). The node is an electrical node at which a voltage, having value $V_s$, volts, is delivered via a resistance (not shown) from the internal power supply 110 of the security module 104. The connection at the node enables the first detector 124 to utilize the voltage from the internal power supply 110 as a tamper detection signal. The power supply voltage "signal" can be utilized for tamper detection in at least three different embodiments, as will be discussed in FIG. 2, FIG. 3, and FIG. 4 respectively.

The second detector 124 can detect an open-circuit condition by using traditional tamper detection techniques that provide a tamper detection signal through an electrical connection with the second conductive trace 130, which is not connected to the internal power supply 110. In some embodiments, the tamper detection system 120 utilizes both the first and second detectors 122, 124 to render it difficult for an attacker to circumvent the different conductive traces of the electronic device 100. Details of how the short-circuit and open-circuit conditions may be detected are discussed below.

Further, in response to tamper detection, the tamper detection system 120 outputs a signal to the CPU 102 within the electronic device 100. In response to receiving the signal, the CPU 102 triggers an appropriate tampering countermeasure, such as disabling one or more operations of the security module 104 and/or one or more operations of the electronic device 100. For example, the CPU 102 can cause the security module 104 to delete an encryption key stored in the memory 112. In some embodiments, the security module 104 itself, in response to detecting tampering (through the tamper detection system 120), triggers a tampering countermeasure, such as erasing the memory 112 (and thereby preventing the sensitive data 114 from being acquired by an attacker).

Figure 2:
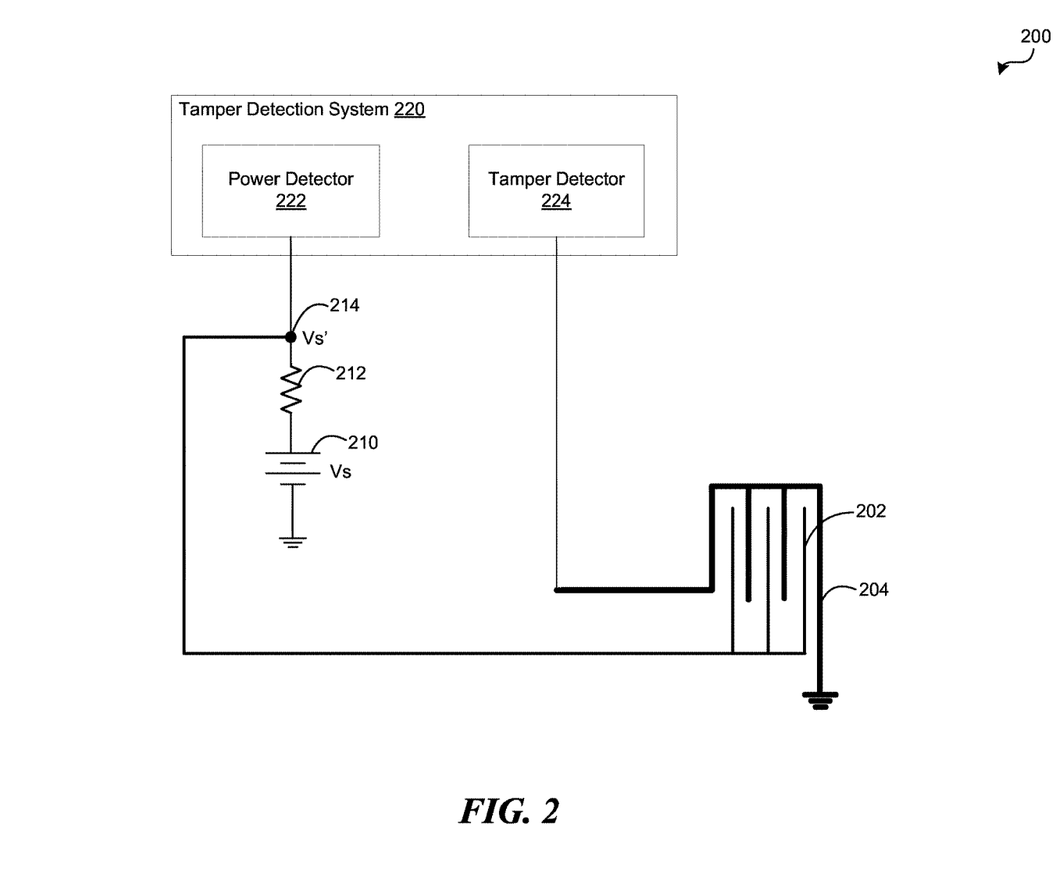
FIGS. 2, 3 and 4 conceptually illustrate various embodiments of the tamper detection technique.

FIG. 2 conceptually illustrates an example implementation of the introduced tamper detection technique, in which a tamper detection system 220 detects tampering on two different conductive traces by using a power detector 222 and a tamper detector 224, in accordance with an embodiment 200. The embodiment 200 can be implemented in the electronic device 100 of FIG. 1. In the illustrated embodiment of FIG. 2, the electronic device is a payment card reader. The tamper detection system 220 of FIG. 2 can be the tamper detection system 110 of FIG. 1, where the power detector 222 can be the first detector 122 of FIG. 1 and the tamper detector 224 can be the second detector 124 of FIG. 1. The power detector 222 can detect a short-circuit condition on a first trace 202 (by utilizing a voltage source 210) while the tamper detector 224 can detect an open-circuit condition on a second trace 204. The voltage source 210 can be the internal power supply 110 of FIG. 1.

The illustrated embodiment of FIG. 2 renders it more difficult for an attacker to tamper with the electronic device by providing, in the same local area, two conductive traces having two different signals, where the first trace 202 is tied to the power detector 222 via the voltage source 210 (i.e., introduced technique), and the second trace 204 is tied to the tamper detector 224 (i.e., traditional technique). With such a configuration, an attempt to break into the electronic device may inadvertently cause a short-circuit prior to, or in addition to, causing an open-circuit. For example, if a wrongdoer attempts to drill into the housing, the metal drill bit (which is conductive) may actually prevent (at least temporarily) an open-circuit condition on the traditional trace, but may cause a short-circuit on the other trace that is closely located next to the traditional trace, where the other trace is tied to the voltage source 210. As will be discussed in further detail below, the short-circuit condition in this example occurs as a result of a connection created between the first trace 202 to the second trace 204 across the metal drill bit, such that node 214 is shorted directly to the ground at the end terminal of the second trace 204.

Accordingly, in the illustrated embodiment, the power detector 222 is electrically connected in series to the voltage source 210 (having value $V_s$ volts) via a load resistance 212. The resistance 212 can have a value ranging, for example, from 4.7KΩ to 10KΩ. The first trace 202 is connected to the power detector 222 at a node 214 that is electrically downstream from the load resistance 212. The node 214 enables the power detector 222 to connect with both (a) the first trace 202 and (b) the voltage source 210 via the load resistance 212. The second trace 204 is connected to the tamper detector 224. The tamper detection system 220 can detect one or more tampering events within the electronic device upon receiving a tamper signal from either of the detectors 222, 224 that are coupled to the first and second traces 202, 204. In such a "dual-trace" embodiment, the first trace 202 may be used to a detect short-circuit condition while the second trace 204 is used to detect an open-circuit condition.

The traces 202, 204 can be disposed along an interior planar layer of the electronic device (e.g., a circuit board layer). In some embodiments, the traces 202, 204 can be disposed within the electronic device in close proximity to each other and parallel to each other. As used here, the phrase "in proximity" means that the two traces are as close together as reasonably possible in light of the relevant manufacturing constraints, which in one embodiment is, for example, within about 1 mm of each other. Further, as used here, the phrase "in parallel" refers to the spatial relationship between the traces, not necessarily their electrical configuration. In some embodiments, the traces 202, 204 can be interwoven with each other. An example of the traces 202, 204 being interwoven, in proximity, and in parallel paths, across one or more planar surfaces or layers within the electronic device is shown in FIG. 2. Note, however, the traces 202, 204 can be disposed within the electronic device in any combination other than that which is shown in FIG. 2.

In operation, the power detector 222 nominally detects, at the node 214, a voltage of $V_{s'}$ across the load resistance 212. If an attacker inadvertently connects the node 214 to ground through the first trace 202 and the second trace 204 (e.g., shorting the first trace 202 and the second trace 204), a short-circuit condition occurs. Accordingly, the power detector 222 will detect, at the node 214, such short-circuit condition as a drop in voltage across the load resistance 212, from $V_{s'}$ to zero volts. The power detector 222 perceives this drop in voltage as a collapse of the voltage source 210 and an indication of tampering. In some embodiments, in response to such collapse of the voltage source 210 (i.e., short-circuit condition), the tamper detection system 220, containing the power detector 222, sends a message signal indicating occurrence of tampering to the CPU. The CPU, in response to that message, outputs a signal that disables one or more operations of the electronic device, for example, a security module of the CPU (e.g., security module 104).

Further, in operation, the tamper detector 224 can detect an open-circuit condition on the trace 204 if an attacker inadvertently disconnects the tamper detector 224 from ground (e.g., as a result of a break or disconnect occurring on the trace 204). The tamper detector 224 perceives this open-circuit condition as a tampering event. In some embodiments, in response to detection of the open-circuit condition, the tamper detection system 220, containing the tamper detector 222, sends a message signal indicating occurrence of tampering to the CPU. The CPU, in response to that message, outputs a signal that disables one or more operations of the electronic device, for example, a security module of the CPU (e.g., security module 104 of FIG. 1). In the embodiment of FIG. 2, the CPU can output the disabling signal upon receiving the message (indicating tampering) from the tamper detector 224 alone, the power detector 222 alone, or a combination thereof.

Figure 3:
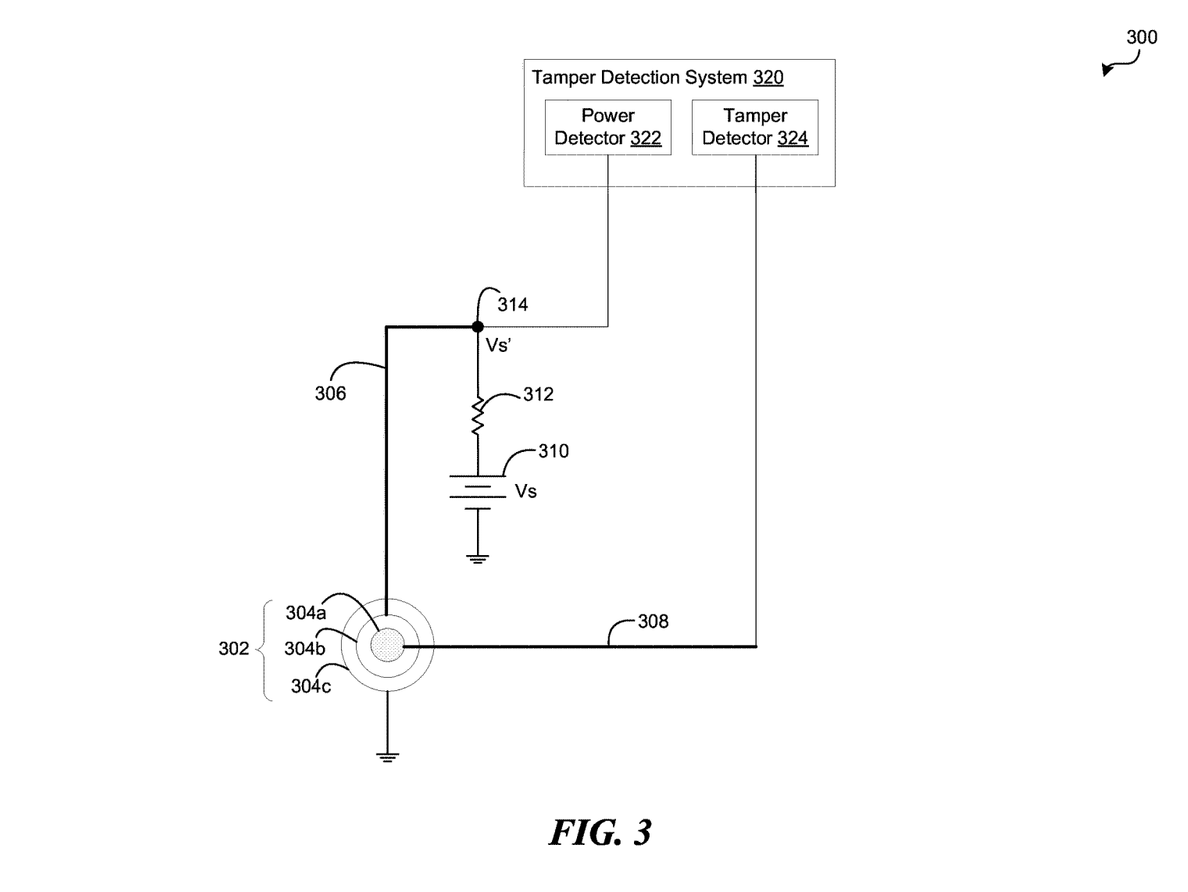

FIG. 3 conceptually illustrates an example implementation of the introduced tamper detection technique, in which a tamper detection system 320 utilizes a power detector 322 and a tamper detector 324 to detect tampering on one or more conductive traces that include a metal dome switch 302 disposed within an electronic device, in accordance with an embodiment 300. The embodiment 300 can be implemented in the electronic device 100 of FIG. 1. In the illustrated embodiment of FIG. 3, the electronic device is a payment card reader. The tamper detection system 320 can be the tamper detection system 110 of FIG. 1, where the power detector 322 can be the first detector 122 of FIG. 1 and the tamper detector 324 can be the second detector 124 of FIG. 1.

The power detector 322 is connected to a trace 306 at an electrical node 314. In some embodiments, the trace 306 can be a conductive path that includes a part, or portion, of the metal dome switch 302 (e.g., a conductive ring included in the metal dome switch 302). The power detector 322 is further connected, at the node 314, to a downstream terminal of a resistance 312 connected in series with a voltage source 310. The voltage source 310 can be the internal power supply 110 of FIG. 1. The resistance 312 can have a value ranging, for example, from 4.7KΩ to 10KΩ. The trace 306 is also connected to the voltage source 310, at one end, via the downstream terminal of the resistance 312. At the other end, the trace 306 is connected to the metal dome switch 302 to facilitate tamper detection. The tamper detector 324 is also connected to the metal dome switch 302 via a trace 308 to facilitate the tamper detection. In some embodiments, the trace 308 can be a conductive path that includes a part, or portion, of the metal dome switch 302 (e.g., a conductive ring included in the metal dome switch 302).

The metal dome switch 302 can be any conventional switch contact used in conjunction with a printed circuit board, a flex circuit, or any other electronic membrane to produce positive tactile feedback. The metal dome switch 302 can include one or more conductive, overlapping rings that form a dome. In operation, the metal dome switch 302 functions as a closed switch when it is depressed (e.g., pushed downward between two surfaces), and an open switch when undepressed.

A conventional technique for tamper detection using a conventional metal dome switch is to affix the switch within an electronic device in a depressed state. During the manufacturing process, for example, the metal dome switch 302 can be depressed between a top ring that is affixed to an interior surface of a housing of the electronic device, and a bottom ring that is affixed to an electrical component or surface of the electronic device (e.g., circuit board). The metal dome switch 302 would be intended to remain with its flexible (compressible) contact in the depressed state, in a closed switch condition, through the lifetime of the electronic device. Any unauthorized attempt to open the housing of the electronic device would remove the pressure that maintains the compression on the flexible contact of the switch. Such pressure removal would cause the metal dome switch 302 to become an open switch condition, which can be detected as tampering (by, e.g., tamper detector 324).

A known form of attack on this conventional technique is to drill into the housing and inject conductive ink into the space between the top and bottom rings of the metal dome switch. With the conductive ink, the metal dome switch remains electrically in a closed switch condition regardless of the compression state of its flexible contact.

The technique introduced here, according to certain embodiments, overcomes the above-mentioned shortcoming of the conventional tamper detection technique by adding a third ring to the traditional metal dome switch. An example of such a switch (having a third ring) is the metal dome switch 302 of FIG. 3. In the illustrated embodiment of FIG. 3, the metal dome switch 302 has a top ring 304a, a middle ring 304b, and a bottom ring 304c, where the top ring 304a and the bottom ring 304c are the flexible contacts. The top ring 304a is connected to the tamper detector 324, the middle ring 304b is connected to the trace 306, and the bottom ring 304c is tied to ground. The present technique detects tampering by utilizing the connections to the rings 304a, 304b, 304c in two ways: (a) through a trace 308 connected to a tamper detector 324 of the tamper detection system 320; and (b) through the trace 306 that is connected in series to the voltage source 310 via the resistance 312, and to the power detector 322.

In operation, the tamper detection system 320 can detect tampering within the device through either of the power detector 322 or the tamper detector 324 detecting a tampering event on the metal dome switch 302. In one embodiment, the power detector 322 detects tampering when there exists a short-circuit condition on the metal dome switch 302, as detected via the trace 306 at the node 314. Under normal operation, the middle ring 304b, which is connected to the trace 306, and the bottom ring 304c, which is grounded, are not in electrical contact with each other. In turn, the power detector 322 nominally detects, at the node 314, a voltage of $V_{s'}$ across the resistance 312. That is, the trace 306 does not affect the power supply voltage provided to the power detector 322 at the node 314. If the middle ring 304b becomes electrically connected to the bottom ring 304c (e.g., as a result of conductive ink injected into the metal dome switch 302), a short-circuit condition will result. The power detector 322 will detect such short-circuit condition as a collapse of the voltage source 310, where the collapse indicates tampering.

In some embodiments, it is the middle ring 304b that is tied to ground, the bottom ring 304c that is connected to the node 314 via the trace 306. In such embodiments, tampering can still be detected when the detector 320 detects a short-circuit condition between the middle and bottom rings 304b, 304c. In some embodiments, it is the top ring 304a that is tied to ground, the middle ring 304b that is connected to the node 314 via the trace 306, and the bottom ring 304c that is connected to the tamper terminal 320. In such embodiments, tampering can be detected when the detector 320 detects a short-circuit condition between the top and middle rings 304a, 304b.

In another embodiment, the tamper detector 324 detects tampering when there exists an open-circuit condition on the metal dome switch 302, as detected via the trace 308. Under normal operation, the metal dome switch 302 is depressed, and the top and bottom rings 304a, 304c are electrically connected due to the depression. In turn, the tamper detector 324 expects the metal dome switch 302 to stay at ground based on the connection between the bottom ring 304c and the top ring 304a. If the metal dome switch 302 becomes undepressed (e.g., as a result of an attempt to open the housing), an open switch, or open-circuit condition, will result and will be detected by the tamper detector 324 via the trace 308.

In some embodiments, it is the top ring 304a that is tied to ground, the middle ring 304b that is tied to the node 314, and the bottom ring 304c that is connected to the trace 308. In such embodiments, tampering can still be detected when the tamper detector 324 detects an open-circuit condition between the top and bottom rings 304a, 304c via the trace 308. In some embodiments, it is the middle ring 304b that is tied to ground, the top ring 304a that is connected to the trace 308, and the bottom ring 304c that is connected to the node 314 via the trace 306. In such embodiments, tampering can be detected when the tamper detector 324 detects an open-circuit condition between the top and middle rings 304a, 304b.

Figure 4:
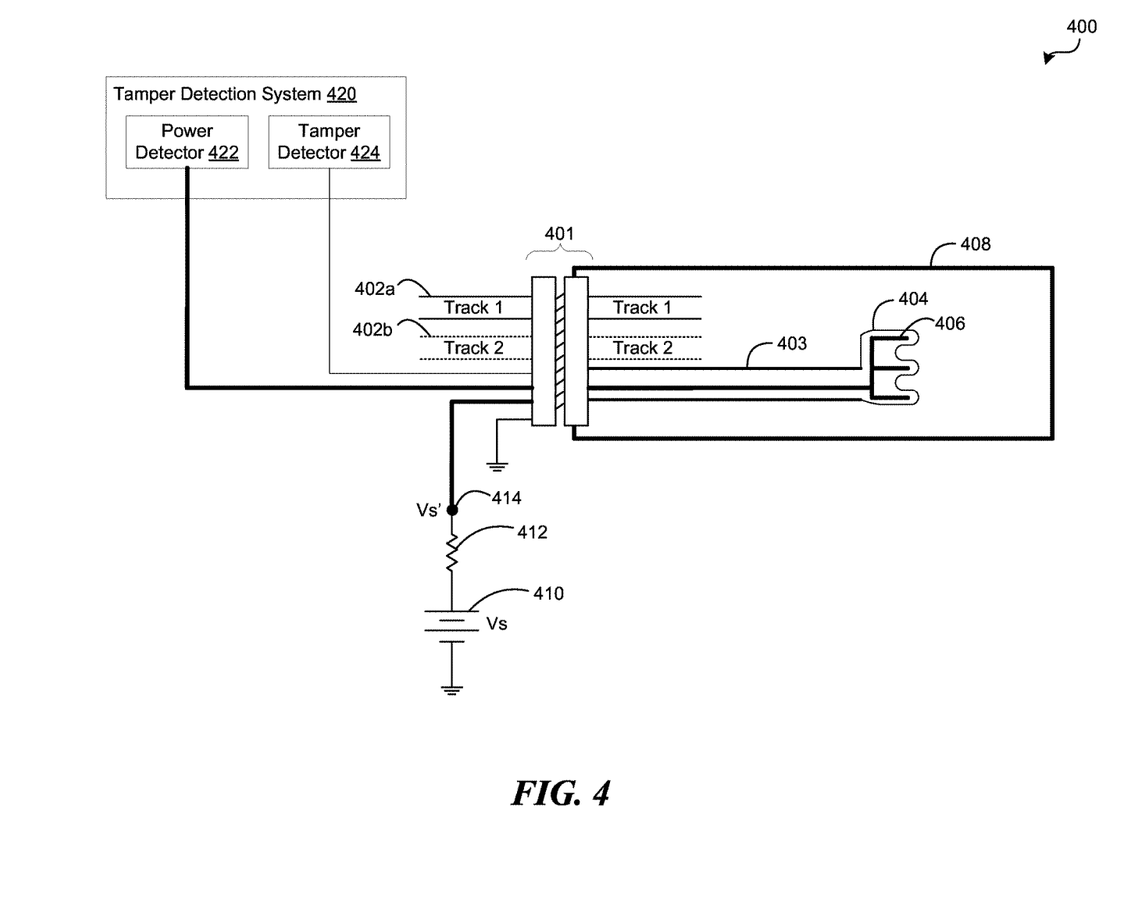

FIG. 4 conceptually illustrates an example implementation of the introduced tamper detection technique, in which a tamper detection system 420 utilizes a power detector 422 and a tamper detector 424 to detect tampering on two conductive traces disposed within an electrical component of an electronic device, in accordance with an embodiment 400. The embodiment 400 can be implemented in the electronic device 100 of FIG. 1. In the illustrated embodiment of FIG. 4, the electronic device is a payment card reader. The example payment card reader includes one or more read heads for reading one or more tracks of data stored on a payment card (not shown). For example, the payment card reader can include two read heads, where a first read head reads data from a first data line (e.g., data line 402*a* reading data from a "Track 1" of a magnetic stripe on a conventional credit card), and a second read head reads data from a second data line (e.g., data line 402*b* reading data from a "Track 2" of the magnetic stripe).

For the sake of simplicity, FIG. 4 illustrates one read head 404 for reading data via a first data line 402*a*. The read head 404 has circuitry that is connected with, or "plugged into," the read head to facilitate the data reading. The circuitry of the read head 404 includes a connector 401 and a flexible circuit board 403 that processes data received through the first data line 402*a*. According to the embodiment of FIG. 4, the tamper detection system 420 detects tampering by utilizing two conductive traces disposed within the read head 404 "system" (i.e., the connector 401, the flexible circuit board 403, and the read head 404). Note that while conductive traces for one read head 404 is illustrated in the embodiment of FIG. 4, these traces can be replicated for each additional read head included in the payment card reader to facilitate the introduced tamper detection technique. Further, note that the tamper detection system 420 of the introduced technique can be used to detect tampering on traces disposed within any input interface of an electronic device, other than the read head 404 discussed in this example.

The conductive traces of FIG. 4 include a first trace 406 and a second trace 408. The trace 406 is disposed within the read head 404 and the flexible circuit board 403 for enabling tamper detection. The trace 408 is disposed within the read head system to further facilitate the tamper detection. Any attempt to meddle with the read head system (e.g., by detaching the flexible circuit board 403, by disassembling the connector 401, or by any tampering with the first data line 402*a*) can be detected through the first trace 406 and/or the second trace 408.

According to the introduced technique, the traces 406, 408 are connected, at an electrical node 414, to a downstream terminal of a resistance 412 that is connected in series with a voltage source 410. The resistance 412 can have a value ranging, for example, from 4.7KΩ to 10KΩ. Via the node 414, the traces 406, 408 are connected to the power detector 422. If a short-circuit condition occurs on either of the traces 406, 408, a drop in voltage at the node 414 will result, and such drop will be detected by the power detector 422 as a collapse of the voltage source 410, indicating tampering. The tamper detection system 420 in response, can output a signal to a CPU of the payment card reader (e.g., CPU 110 of FIG. 1), which will execute an appropriate countermeasure. In some embodiments, the tamper detection system 420 can output a signal that operates as the countermeasure, without communicating to the CPU. For example, the tamper detection system 420 itself erases a memory of a security module contained within the CPU upon detecting a tampering event through either of the power detector 422 or tamper detector 424.

In some embodiments, the tamper detection system 420 can utilize the tamper detector 424 to detect open-circuit condition on additional traces (not shown), in conjunction with the traces 406, 408. The additional traces can be disposed within the read head 404 and flexible circuit board 403 (e.g., spatially parallel and/or interwoven with the trace 406) and/or within the read head system (e.g., spatially parallel and/or interwoven with the trace 408), where the additional traces are not connected to the voltage source 410.

It will be recognized that FIGS. 2, 3, and 4 are only examples of the technique introduced here. Various other embodiments of the technique can be implemented instead of, or in addition to, these examples.

Figure 5:
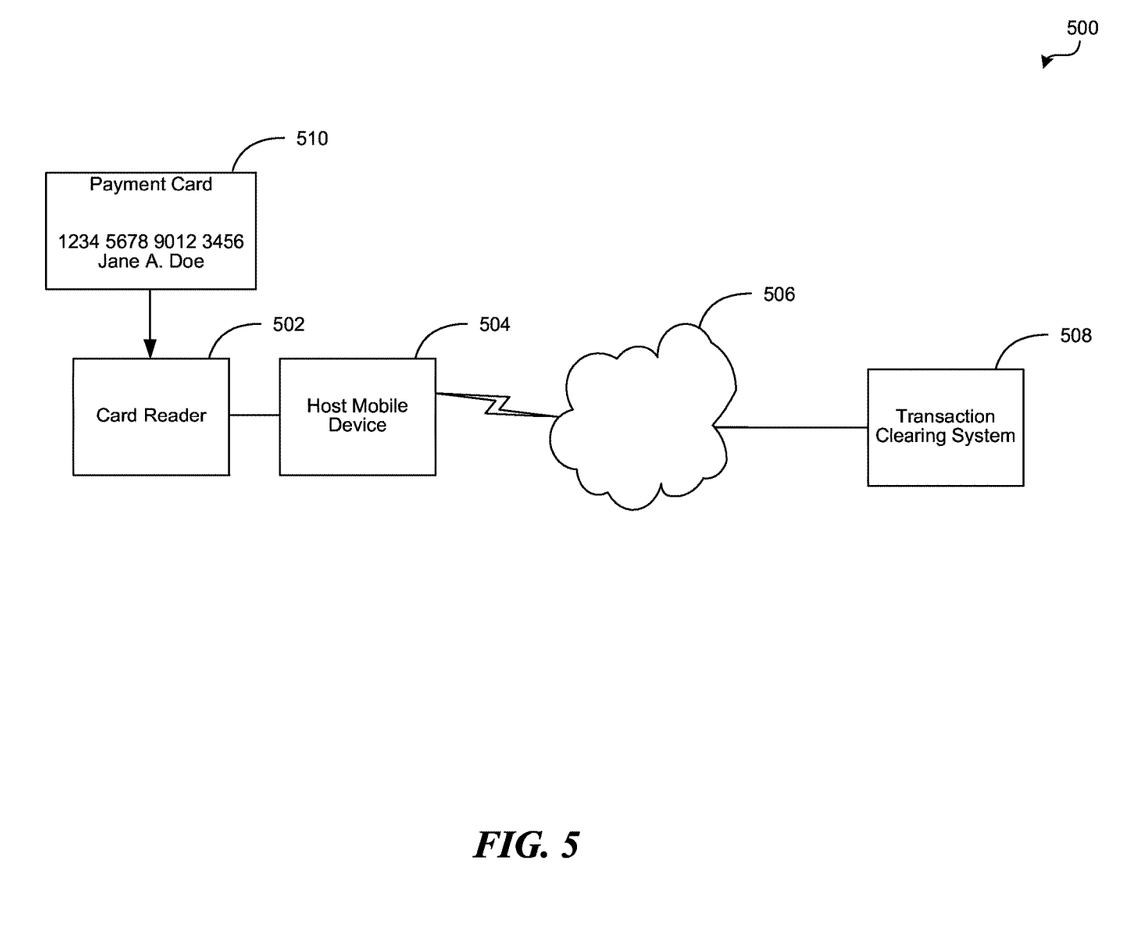
FIG. 5 shows a system that processes a payment card based transaction by use of a card reader with built-in tamper protection using the introduced technique.

FIG. 5 conceptually illustrates an environment 500 in which an electronic device can operate, where the electronic device can be protected by the tamper detection technique introduced above. The electronic device can be any device with computing capabilities. One example of a device in which the introduced technique would be advantageous, as mentioned above, is a miniaturized card reader designed to be coupled to a handheld mobile device, such as a smartphone or computing tablet. Such a device can be used to read data from a payment card or any other kind of wallet-size card that stores data, such as a driver's license, identification card, or the like. As used here, the term "payment card" a debit card, a conventional credit card, a "smartcard" that has an embedded integrated circuit chip (e.g., Europay-MasterCard-Visa (EMV) cards), or any wallet-size card which functions as a combination of any of these payment mechanisms. Such miniaturized payment card readers have been produced to allow merchants to accept payment cards through their smartphones or tablet computers, without the need for a conventional credit card reader or cash register.

The environment of FIG. 5 includes a card reader 502 that is coupled to a host mobile device 504 belonging to a merchant. The host mobile device 504 may be, for example, a tablet computer or a smartphone. During a payment card transaction involving the merchant and a consumer, the card reader 502 reads information from a payment card 510 of the consumer (the "cardholder"). To accomplish this, the card reader 502 includes a card interface (not shown) which may include a conventional magnetic stripe reader, an EMV chip reader, or other suitable type of card interface or combination of interfaces. The card reader 502 reads information from the card 510, such as the cardholder's name, account number, expiration date and/or personal identification number (PIN) and may provide at least some of this information to the host mobile device 504. The host mobile device 504 communicates via a wireless network 506 with a remote transaction clearing system 508, to authenticate the cardholder and authorize the transaction. The transaction clearing system 508 can include one or more conventional data processing devices, such as one or more server-class computers, personal computers, hand-held devices, etc., some of which may be coupled to each other via one or more networks (not shown).

It will be recognized that the tamper detection technique introduced above can also be applied in the host mobile device 504, the transaction clearing system 508 and/or any other device that is part of the illustrated system.

Figure 6:
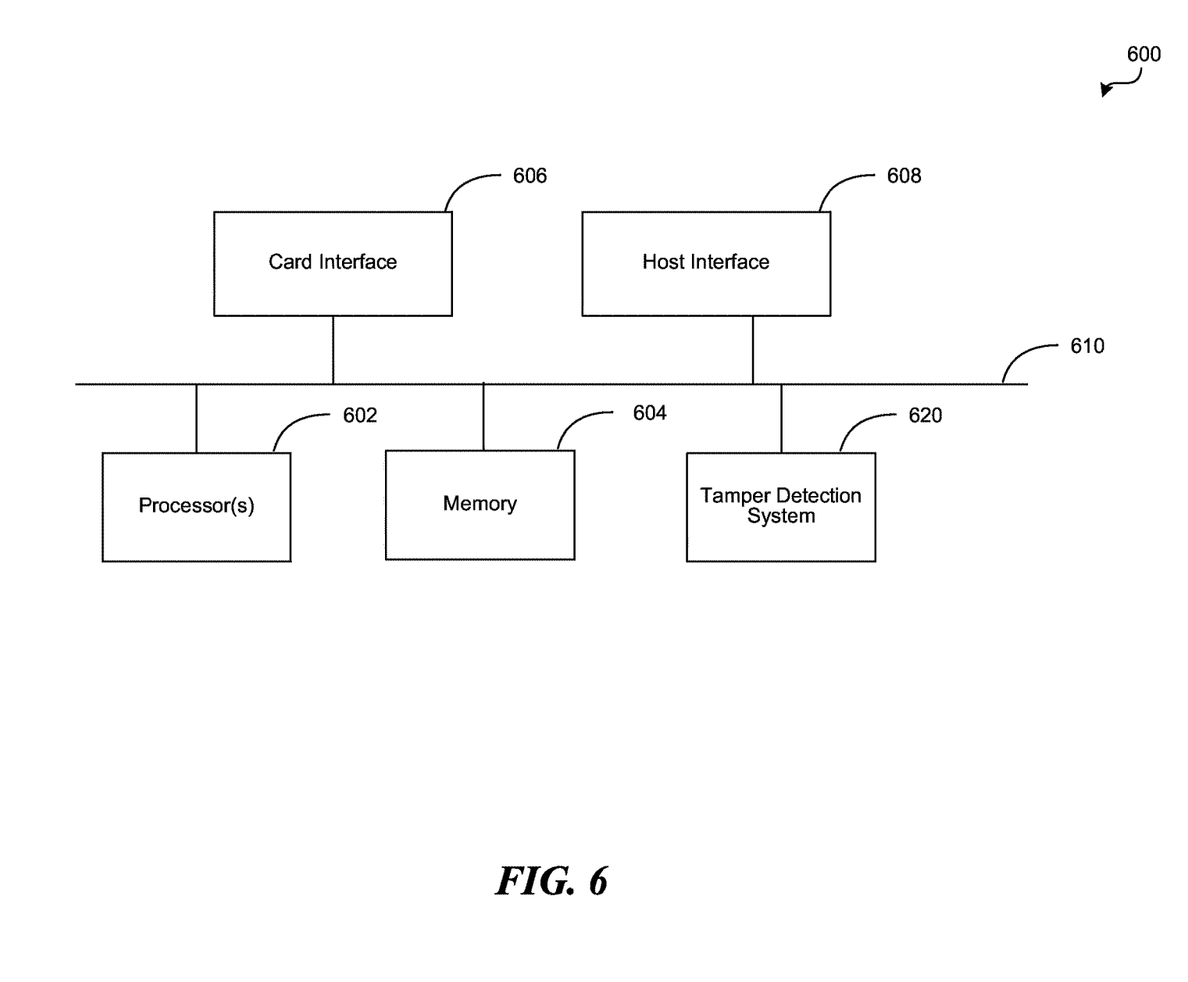
FIG. 6 is a high-level block diagram of the card reader.

FIG. 6 is a high-level block diagram showing an example of the architecture of a processing device 600, such as the card reader 502 of FIG. 5. In the illustrated embodiment, the processing device 600 includes one or more processors 602, a memory 604, a card interface 606, and a host interface 608, all coupled to each other through an interconnect fabric 610. The interconnect fabric 610 may include one or more conductive traces, buses, point-to-point connections, controllers, adapters and/or other conventional connection devices.

Also coupled to the processor(s) 602 is a tamper detection system 620 that receives input from one or more conductive traces (not shown in FIG. 6) via an internal power supply, as described above. The tamper detection system 620 can be the tamper detection system 220 of FIG. 2, the tamper detection system 320 of FIG. 3, or the tamper detection system 420 of FIG. 4. The processor(s) 602 may be or include, for example, one or more general-purpose programmable microprocessors, microcontrollers, application specific integrated circuits (ASICs), programmable gate arrays, or the like, or a combination of such devices. The processor(s) 602 control the overall operation of the processing device 600. Additionally, the processor(s) 602 may respond to a detection signal from the tamper detection system 620 by disabling one or more functions of the processing device 600 or of the host mobile device 504. For example, in response to a detection signal from the tamper detection system 620, the processor(s) 602 may erase the memory 604. In another example, the processor(s) 602 may cause all functionality of the processing device 600 to be disabled in response to a detection signal, i.e., essentially to "self-destruct" functionally.

Memory 604 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 604 may store data and instructions that configure the processor(s) 602 to execute operations in accordance with the techniques described above.

The card interface 606 may be a conventional magnetic stripe reader, EMV chip reader, or other suitable type of card interface, or combination of such interfaces. The host interface 608 enables the card reader to communicate with the host mobile device 504. In various embodiments, the host interface 608 may provide either a wired or wireless connection to the host mobile device 504. In one embodiment, the host interface 608 includes a connector (not shown) that connects to an audio jack of the host mobile device 504.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A card reader with built-in tamper protection, comprising:
   a processor;
   a card reader interface, coupled to the processor, to read data from a wallet-size card;
   an output terminal, connectable to a mobile device, through which to output the data read from the wallet-size card to the mobile device;
   a security module to perform a security operation of the card reader;
   a first conductive trace and a second conductive trace disposed within the card reader to facilitate tamper detection;
   a battery to supply power only to the security module, the battery serving as the sole source of power for the security module;
   a resistor through which to supply the power from the battery for use in the tamper detection, the resistor having a first terminal coupled to the battery and a second terminal coupled to the first conductive trace; and
   a tamper detection system including a first detector and a second detector to detect a plurality of tampering-induced conditions associated with the first and second conductive traces respectively, and in response to detecting any of the plurality of tampering-induced conditions, to output a signal to disable said security operation of the card reader, the plurality of tampering-induced conditions including a short circuit condition and an open circuit condition,
   wherein the first detector of the tamper detection system is coupled to the first conductive trace to detect the short circuit condition on the first conductive trace as a drop in voltage below a predetermined threshold, the drop in voltage resulting from substantially all voltage of the battery being dropped across the resistor upon a first tampering with the card reader, the first tampering causing the first conductive trace to connect electrically with the second conductive trace resulting in the drop in voltage, and
   wherein the second detector of the tamper detection system is coupled to the second conductive trace to detect the open circuit condition on the second conductive trace upon a second tampering with the card reader, the second tampering causing a disconnection within the second conductive trace.

2. The card reader of claim 1, wherein portions of the first and second conductive traces are interwoven with each other along a circuit board layer of the card reader.

3. The card reader of claim 2, wherein the first conductive trace includes a conductive dome switch affixed to an interior surface of a housing of the card reader.

4. The card reader of claim 1, further comprising:
   a flexible circuit coupled to the card reader interface to facilitate reading of the data from the payment card;
   a third conductive trace disposed within the flexible circuit; and
   a fourth conductive trace disposed within the card reader interface,
   wherein the tamper detection system is further coupled to the third and fourth conductive traces to detect a particular short circuit condition associated with the card reader interface.

5. An electronic device comprising:
   an internal power source dedicated to supplying power only to a security module of the electronic device and serving as the sole source of power for the security module;
   a first conductor coupled in series with the internal power source via a resistance, the resistance having a first terminal coupled to a positive terminal of the internal power source and a second terminal coupled to the first conductor, the first conductor disposed within the electronic device to facilitate tamper detection;
   a second conductor disposed within the electronic device to further facilitate the tamper detection;
   a first detector coupled to the first conductor and configured to detect a first electrical condition associated with the first conductor and to output a signal to disable an operation performed by the security module in response to detecting the first electrical condition,
   wherein the first electrical condition is a drop in voltage below a predetermined threshold, and
   wherein the drop in voltage is caused by the first conductor electrically connecting to the second conductor upon a first tampering with the electronic device, which results in substantially all voltage supplied by the internal power source being dropped across the resistance.

6. The electronic device of claim 5, wherein the second conductor is disposed in proximity to the first conductor within the electronic device, the electronic device further comprising:
- a second detector coupled to the second conductor and configured to detect a second electrical condition associated with the second conductor and to output a signal to disable the operation performed by the security module in response to detecting the second electrical condition,
- wherein the second electrical condition is caused by a disconnect between the second detector and the second conductor upon a second tampering with the electronic device.

7. The electronic device of claim 6, wherein portions of the first and second conductors are interwoven with each other along an interior planar layer of the electronic device such that the first conductor is electrically connected to the second conductor upon the first tampering.

8. The electronic device of claim 6, wherein the first and second conductors are interwoven metal loops that traverse an interior planar layer of the electronic device along spatially parallel paths.

9. The electronic device of claim 5, further comprising:
- an input interface having an interface circuit; and
- a third conductor disposed within the interface circuit;
- wherein the first detector is further coupled to the third conductor to detect a third electrical condition associated with the interface circuit.

10. The electronic device of claim 9, further comprising:
- a fourth conductor disposed within the input interface;
- wherein the first detector is further coupled to the fourth conductor to detect a fourth electrical condition associated with the input interface.

11. The electronic device of claim 5, wherein the first conductor includes a conductive dome switch affixed to an interior surface of a housing of the electronic device.

12. The electronic device of claim 6, wherein the second conductor includes a metal loop that traverses an interior planar layer of the electronic device.

13. The electronic device of claim 5, wherein the first electrical condition is a short circuit condition.

14. The electronic device of claim 5, wherein the electronic device is a card reader configured to read data from a wallet-size card based on a card swipe.

15. A method of detecting tampering in an electronic device, the method comprising:
- supplying power in the electronic device from a power source that powers only a security circuit within the electronic device to enable the security circuit to perform an operation,
  - where the power source serves as the sole source of power for the security circuit;
- monitoring for a first electrical condition on a first conductor disposed within the electronic device for tamper detection,
  - where the first conductor is coupled in series via a resistance to the power source that powers the security circuit,
  - where the first electrical condition is caused by the first conductor electrically connecting to a second conductor upon a first tampering with the electronic device, and
  - where the first electrical condition is a drop in voltage below a predetermined threshold;
- permitting the operation to be performed by the electronic device while the monitoring does not detect the first electrical condition on the first conductor; and
- disabling the operation in response to detecting the first electrical condition on the first conductor.

16. The method of claim 15, wherein the first electrical condition is a short circuit condition, and wherein the drop in voltage is a drop of substantially all voltage supplied by the power source across the resistance that is caused by the first tampering.

17. The method of claim 15, wherein the electronic device is a payment card reader configured to be coupled to a mobile device.

18. The method of claim 15, further comprising:
- monitoring for a second electrical condition on the second conductor disposed within the electronic device for tamper detection, the second electrical condition caused by a disconnect within the second conductor upon a second tampering with the electronic device;
- permitting the operation to be performed by the electronic device while the monitoring does not detect the second electrical condition on the second conductor; and
- disabling the operation in response to detecting the second electrical condition on the second conductor.

19. The method of claim 18, wherein the second electrical condition is an open circuit condition.

20. The method of claim 18, wherein the second conductor is disposed in proximity to the first conductor within the electronic device.

21. The method of claim 20, wherein the first and second conductors are interwoven metal loops that traverse an interior planar layer of the electronic device along parallel paths.

22. The method of claim 15, further comprising:
- monitoring for a third electrical condition on a third conductor disposed within an input interface of the electronic device, the third conductor coupled in series to the power source via the resistance, the third electrical condition caused by the third conductor connecting to the second conductor upon a third tampering with the electronic device;
- permitting the operation to be performed by the electronic device while the monitoring does not detect the third electrical condition on the third conductor; and
- disabling the operation in response to detecting the third electrical condition on the third conductor based on the voltage detected at the third conductor.

23. The method of claim 22, wherein the third electrical condition is a short circuit condition detected as a drop in the voltage below a predetermined threshold.

24. The method of claim 23, wherein the third electrical condition is indicative of a tampering with an interface circuit associated with the input interface.

* * * * *